Patented May 10, 1949

2,469,833

UNITED STATES PATENT OFFICE 2,469,833

COPOLYMERS OF BUTADIENE AND ALKYL ESTERS OF ALPHA, BETA DICHLORO-ACRYLIC ACID

Joy G. Lichty, Stow, Ohio, assignor to Wingfoot Corporation, Akron, Ohio, a corporation of Delaware No Drawing. Application September 10, 1943, Serial No. 501,849

3 Claims. (Cl. 260—93)

This invention relates to polymerized masses and methods of preparing the same. More particularly, it relates to copolymers containing as one constituent thereof an ester of alpha, beta dihaloacrylic acid.

Mixtures of various monomers have been proposed and utilized for the preparation of plastic masses having utility as substituents for rubber, in varnishes, molding, and the like. The present invention is founded on the discovery that esters of alpha, beta dihaloacrylic acid may be interpolymerized with one or more other monomeric materials to yield masses suitable for use as synthetic rubbers and the like. The halo substituent may be chlorine or bromine.

The polymerization may be accomplished by any of the methods customarily used in the preparation of copolymers of this type, such as by heating the materials under anhydrous conditions with or without a solvent or in aqueous emulsions in the presence of polymerization catalysts, promoters, and modifying agents. In emulsion polymerizaton the following emulsifying agents may be used: sodium oleate, the higher sodium alkyl sulfates, sodium alkylated naphthalene sulfonates, etc. The monomers may be present in various proportions—say from 10 per cent up to 90 per cent of one and the inverse proportion of the other although even less than 10 per cent of one constituent may be present. Preferably, at least 25 per cent of each monomer is present. The temperature employed may range from room temperature to as high as 80° C. but will be chosen according to the result desired. An oxidant, such as sodium perborate, benzoyl peroxide, hydrogen peroxide or the like, is employed in the emulsion polymerization; and a catalyst, such as carbon tetrachloride or the like, may also be used. The polymerization is conducted for such a period of time as to give a latex of the required characteristics, several hours usually being required, but often over a day being necessary.

The following examples illustrate the invention. In each case the polymerization was conducted with butadiene and an ester of dichloroacrylic acid in a sealed glass vessel at a temperature of 38° C., and the hydrogen ion concentration was maintained at a given figure by McIlvain buffer (ammonium phosphate-citrate). The emulsifier used was Duponol (sodium lauryl sulfate. Other emulsifiers may be used.

|  | Example 1 | Example 2 | Example 3 | Example 4 |
|---|---|---|---|---|
| Ester | Ethyl | Butyl | Isopropyl | Isobutyl. |
| Amount of Ester | 25.6 g | 128 g | 128 g | 160 g. |
| Amount of Butadiene | 38.4 g | 192 g | 192 g | 160 g. |
| Emulsifier | 2.4 g. in 40 c.c.H₂O | 12 g. in 200 c.c.H₂O | 12 g. in 200 c.c.H₂O | 12 g. in 200 c.c.H₂O |
| NaCN | 2 cc. 10% solution | 5 cc. 10% solution | 5 cc. 10% solution | 5 cc. 10% solution. |
| Acetaldehyde | 2 cc. 10% solution | 10 cc. 10% solution | 10 cc. 10% solution | 10 cc. 10% solution. |
| H₂SO₄ | 1 cc. 4 N | 15.5 cc. 3.95 N | 7.75 cc. 3.95 N | 15.5 cc. 3.95 N. |
| NaBO₃ | 2.12 g | 16 g | 10.66 g | 16 g. |
| CCl₄ | 1.92 g | 9.6 g | 9.6 g | 9.6 g. |
| Final pH | 6.95 | 6.7 | 6.55 | 6.9. |
| Hours | 39 | 45.5 | 44 | 33.5. |
| Yield | 73.8% | 82% | 70% | 78.5%. |

The dihaloacrylates may be prepared in any one of several ways. In my application Serial No. 390,333, filed April 25, 1941, now abandoned, their preparation by pyrolysis of trichloropropionates is described. Other methods include the reaction of an acid halide and alcohol—as, for example, the reaction of dichloroacrylyl chloride and ethyl alcohol—and the alcoholysis of a dihaloacrylonitrile—as, for example, the treatment of dichloroacrylonitrile with ethyl alcohol in an aqueous solution of hydrochloric acid. The alcoholysis of the dihaloacrylonitriles is most satisfactory when applied to primary alcohols.

The dichloroacrylates used in the above examples may be prepared as follows:

It has been found that trihalo propionitriles may be pyrolyzed under favorable conditions to yield dihalo acrylonitriles in satisfactory yield. Thus, trichloro propionitrile may be pyrolyzed to split off hydrogen chloride and leave dichloro acrylonitrile, in accordance with the following equation:

$$CH_2Cl-CCl_2-CH \rightarrow CHCl=CCl-CN+HCl$$

Other dihaloacrylonitriles, such as dibromoacrylonitrile may be similarly prepared. Some alpha haloacrylonitrile will also be produced and the yield of this may be increased at the expense of the dihalo compound by the use of a dehalogenating agent, such as iron, magnesium shavings, zinc, copper and brass. This reaction proceeds as follows:

$$CH_2Cl-CCl_2-CN \rightarrow CH_2=CCl-CN + Cl_2$$

The dehalogenating agent acts to abstract a mol of halogen from the trihalo propionitrile. The production of dihalo acrylonitriles proceeds best in a metal tube, since it is desirable to have the tube made of a material of good heat conductivity; however, only such materials should be employed as do not act as dehalogenating agents. Among these may be mentioned tantalum and various alloys containing chromium or nickel or both, such as Nichrome and Chromel metal. The pyrolysis should be carried on at temperatures ranging from 300–650° C., but best results are obtained in the range 400–550° C.

To illustrate the method, the following examples are given.

EXAMPLE 1

A total of 3840 grams of trichloro propionitrile (alpha dichloro beta chloro propionitrile) was passed through a reactor at atmospheric pressure during a period of 130 minutes, the temperature being maintained in the reactor between 415–460° C. The reactor was a 2″ x 6′ standard pipe fitted with two thermocouple wells and heated by electricity. The pipe was filled with quartz pellets and both the pellets and the iron tubing acquired a coating of carbon. The condensate from the pyrolysis was distilled from hydroquinone and gave the following products:

|  | Yield per cent |
|---|---|
| Alpha chloroacrylonitrile, 247 g. | 11.8 |
| Alpha, beta-dichloroacrylonitrile, 2173 g. | 79.5 |
| Trichloropropionitrile, 76 g. | |
|  | 91.3 |

EXAMPLE 2

In this example, the pyrolysis was conducted in a 27 mm. glass tube filled with Berl saddles. The apparatus consisted of a heavy iron cylinder with a heating coil surrounding it and the temperature was taken on the inside of this cylinder. Trichloro propionitrile was volatilized under reduced pressure into the heated area of the glass tube, the tube being heated over a length of 50 cm. A total of 92.5 grams of the trichloro propionitrile was passed through the system in a period of 60 minutes, the temperature ranging from 460–470° C. and the pressure being 220 mm. The exit gases were chilled in an acetone-Dry-Ice-bath. Distillation from hydroquinone gave the following products:

Dichloroacrylonitrile _____ 54.8 g. or 84.5% yield
Trichloropropionitrile _____ 11.3 g.

EXAMPLE 3

In this instance, the Berl saddles in the apparatus employed in Example 2 were replaced with loosely packed steel wool. A total of 274 grams of trichloropropionitrile was volatilized through the apparatus at the rate of 3 grams per minute. The reaction temperature was in the neighborhood of 475° C. and the pressure was 200–230 mm. Distillation of the condensate yielded the following materials:

|  | Yield per cent |
|---|---|
| Monochloroacrylonitrile, 15.5 g. | 11 |
| Dichloroacrylonitrile, 148.5 g. | 75 |
| Trichloropropionitrile, 18.0 g. | |

The conditions of pyrolysis indicated in the foregoing examples may be varied in many respects. Thus, the substance to be pyrolyzed may be pre-heated before passing into the reaction zone or this pre-heating may be omitted. The furnace may be either vertical or horizontal, although it is preferred to have the furnace in a vertical position with the raw material being fed in at the top. This disposition of the apparatus permits tarry material to drip out at the base and prevents clogging of the tube. This is especially important where iron is used as the catalyst since much ferric chloride is formed. The pressure prevailing during the reaction may be either atmospheric pressure or less than atmospheric, and even pressures above atmospheric may be used.

EXAMPLE A

Ethyl alpha, beta dichloroacrylate

A mixture containing 250 cc. 95 per cent alcohol, 107 cc. conc. H_2SO_4, 122 g. dichloroacrylonitrile, and 1 g. each hydroquinone and diphenyl phenylene diamine was refluxed on a steam bath for a period of 18 hours. The cooled product was poured into 300 cc. of water. The lower layer was removed, dried over CaCl_2, and distilled. This gave ethyl dichloroacrylate boiling at 93–98° C./50 mm. and considerable unchanged dichloroacrylonitrile.

Hydrochloric acid may be used instead of sulphuric, if preferred.

EXAMPLE B n-Butyl alpha, beta dichloroacrylate

A mixture of 122 g. dichloroacrylonitrile, 111 g. n-butyl alcohol, 20 cc. water, and 1 g. hydroquinone was heated under reflux on a steam bath. This mix was treated with dry HCl for three hours. The low boiling fractions obtained on distillation contained the alcohol and nitrile which were retreated with HCl. A good yield of n-butyl dichloroacrylate boiling at 106° C./21 mm. was obtained which had the following properties: $D_{15}^{26}$ 1.199. $N_D^{26}$ 1.4692.

EXAMPLE C

Isopropyl alpha, beta dichloroacrylate

A total of 1477 g. dichloroacrylyl chloride was maintained at a temperature of about 90° C. during the addition of 601 g. anhydrous isopropyl alcohol. Distillation yielded isopropyl alpha, beta dichloroacrylate boiling at 93–98° C./35 mm. Some higher boiling trichloropropionate was also obtained.

EXAMPLE D

Isobutyl alpha, beta dichloroacrylate

A mixture of 122 g. dichloroacrylonitrile, 111 g. isobutyl alcohol, 20 cc. water, and 1 g. hydroquinone was heated under reflux on a steam bath. Dry HCl was bubbled into the mix for four hours. The NH_4Cl was removed by filtration and washed with isobutyl alcohol. The filtrate was subjected to distillation without additional treatment. This gave a good yield of isobutyl alpha, beta dichloroacrylate boiling at 101–106° C./25 mm.

Other dichloroacrylates which may be used in carrying out this invention include the methyl, propyl, mixed amyl, etc. Other dihalo esters include ethyl alpha, beta dibromoacrylate and mixed chloro and bromo alpha, beta acrylates, etc. The esters of the dihaloacrylic acids may be copolymerized with one or more other monomeric substances, preferably a compound containing a vinyl radical and compounds containing the vinylidene, such as butadiene, isoprene, 2,3-dimethyl butadiene-1,3, chloroprene, cyanoprene styrene and its homologues, acrylonitrile, vinylidene chloride, and the alpha alkyl-substitutes acrylonitriles, such as methacrylonitrile, etc.

It will be obvious that the invention is not limited to the esters of the acrylic series mentioned above but that these are merely representative. Also, the other monomeric constituent of the class of copolymers described may be any of the those mentioned herein or other substances found to be suitable in the formation of polymerized masses.

While there have been described above the preferred embodiments of the invention, it will be apparent to those skilled in the art that various modifications and changes may be made therein without departing from the spirit of the invention or from the scope of the appended claims.

This application is in part a continuation of my application Serial No. 493,911, filed July 8, 1943, which in turn is a continuation-in-part of application Serial No. 367,771 filed November 29, 1940; both of these applications are now abandoned.

What I claim is:

1. Copolymers resulting from reacting a mixture containing from 10 percent to 90 percent of an alkyl ester of alpha, beta dichloroacrylic acid and 90 percent to 10 percent of butadiene-1,3.

2. A copolymer resulting from reacting a mixture containing from 10 percent to 90 percent of ethyl alpha, beta dichloroacrylate and 90 percent to 10 percent of butadiene-1,3.

3. Copolymers resulting from reacting a mixture containing from 10% to 90% of an alkyl ester of alpha, beta-dichloroacrylic acid in which the alkyl radical contains one to four carbon atoms and 90 to 10% of butadiene-1,3.

JOY G. LICHTY.

REFERENCES CITED

The following references are of record in the file of this patent:

UNITED STATES PATENTS

| Number | Name | Date |
| --- | --- | --- |
| 2,228,270 | Hopff et al. | Jan. 14, 1941 |
| 2,263,598 | Starck et al. | Nov. 25, 1941 |
| 2,326,736 | Adelson et al. | Aug. 17, 1943 |
| 2,334,358 | Smith | Nov. 16, 1943 |
| 2,337,681 | Pollack | Dec. 28, 1943 |
| 2,362,960 | Thomas | Nov. 14, 1944 |

FOREIGN PATENTS

| Number | Country | Date |
| --- | --- | --- |
| 360,822 | Great Britain | Oct. 30, 1931 |
| 514,912 | Great Britain | Nov. 2, 1939 |

Certificate of Correction

Patent No. 2,469,833.

May 10, 1949.

JOY G. LICHTY

It is hereby certified that errors appear in the printed specification of the above numbered patent requiring correction as follows:

Column 2, lines 40 and 41, strike out the following paragraph and colon:

"The dichloroacrylates used in the above examples may be prepared as follows:"

and insert the same in column 4, line 23, after the word and period "used." and before the heading "Example A"; line 55, for the numeral "1477" read *1447*; column 5, line 8, after the word "vinylidene" and before the comma insert *radical*;

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*